(12) United States Patent
Lehtinen et al.

(10) Patent No.: US 6,532,226 B1
(45) Date of Patent: Mar. 11, 2003

(54) METHOD AND ARRANGEMENT FOR OPTIMAL SCHEDULING OF SLOTTED-MODE RELATED MEASUREMENTS IN A CELLULAR RADIO SYSTEM

(75) Inventors: Otto-Aleksanteri Lehtinen, Raisio (FI); Antti Toskala, Helsinki (FI)

(73) Assignee: Nokia Mobile Phone Ltd., Espoo (FI)

( * ) Notice: Subject to any disclaimer, the term of this patent is extended or adjusted under 35 U.S.C. 154(b) by 0 days.

(21) Appl. No.: 09/435,910

(22) Filed: Nov. 8, 1999

(30) Foreign Application Priority Data

Nov. 9, 1998 (FI) .................................................. 982432

(51) Int. Cl.[7] .............................................. H04B 7/212
(52) U.S. Cl. ....................... 370/347; 370/442; 370/331; 455/436; 455/552
(58) Field of Search ................................ 370/347, 341, 370/442, 522, 524, 321, 337, 336, 338, 503, 345, 343, 509, 331, 332; 455/436, 437, 438, 439, 442, 552

(56) References Cited

U.S. PATENT DOCUMENTS

| | | | | |
|---|---|---|---|---|
| 6,047,185 A | * | 4/2000 | Sanden ........................ | 455/422 |
| 6,112,100 A | * | 8/2000 | Ossoinig et al. ............ | 370/350 |
| 6,308,066 B1 | * | 10/2001 | Ranta et al. ................. | 370/331 |
| 6,337,987 B1 | * | 1/2002 | Agin et al. .................. | 370/318 |
| 6,337,989 B1 | * | 1/2002 | Agin ............................ | 370/318 |
| 6,385,437 B1 | * | 5/2002 | Park et al. ................... | 455/522 |

FOREIGN PATENT DOCUMENTS

| | | | | |
|---|---|---|---|---|
| EP | 0853439 A2 | * | 7/1998 | H04Q/7/38 |
| WO | WO 94/29981 | | 12/1994 | |
| WO | WO 96/23369 | | 8/1996 | |
| WO | WO 98/18217 | | 4/1998 | |
| WO | WO 98/31154 | | 7/1998 | |
| WO | WO 99/01000 | | 1/1999 | |
| WO | WO 99/56405 | | 11/1999 | |

* cited by examiner

*Primary Examiner*—Nay Maung
*Assistant Examiner*—Sonny Trinh
(74) *Attorney, Agent, or Firm*—Perman & Green, LLP

(57) ABSTRACT

The timing of frames associated with a certain first communication connection (301) and allocated for measurement and reception of signalling (302, 303) external to said first communication connection is defined in a cellular radio system. Transmission associated with communication connections is essentially continuous and consists of consecutive frames. Measurement and reception of signalling external to a communication connection necessitates an interruption in the otherwise continuous transmission associated with the communication connection. According to the invention, there is established (701) knowledge that indicates at least one future occurrence of signalling external to the first communication connection. Further there is identified (702), on the basis of said established knowledge, a future frame (305, 307, 308, 310) associated with the first communication connection that will coincide in time (304, 306, 309) with said future occurrence of signalling external to the first communication connection. The identified future frame will be defined as a frame allocated for measurement and reception of signalling external to the first communication connection.

18 Claims, 3 Drawing Sheets

METHOD AND ARRANGEMENT FOR OPTIMAL SCHEDULING OF SLOTTED-MODE RELATED MEASUREMENTS IN A CELLULAR RADIO SYSTEM

TECHNOLOGICAL FIELD

The invention relates generally to the scheduling of run-time measurements and signalling reception in a cellular radio system. Especially the invention relates to the optimization of measurement and reception schedules in a situation where a mobile terminal is able to operate on several frequency bands and perform handovers between the frequency bands.

BACKGROUND OF THE INVENTION

At the time of filing of this patent application a decision has been made to accept WCDMA (Wideband Code Division Multiple Access) as one of the multiple access schemes of an universal third generation cellular radio system known as the UMTS (Universal Mobile Telecommunication System), where a terrestrial base station subsystem is known as the UTRA (UMTS Terrestrial Radio Access). In CDMA, the transmission on a certain channel is generally continuous in contrast to TDMA systems (Time Division Multiple Access) where each channel reserves a certain cyclically repeating time slot. However, both in CDMA and TDMA it is customary to arrange the transmission into consecutive frames of constant duration.

In order for a mobile terminal to fully exploit the available cellular resources it will be very advantageous if it can communicate with both third and second generation base stations and move from the cell of one to the cell of another according to the momentary availability and pricing of services at a reasonable connection quality. In order to continuously look for the optimal base station to communicate with, a mobile terminal must perform measurements that reveal the signal strength it is able to receive from each candidate base station. Additionally the terminal must receive certain signalling messages from the candidate base stations in order to plan ahead for a cell reselection or a handover. It has been widely recognised that if a terminal is currently communicating with a CDMA base station, it needs some short time intervals during which the otherwise continuous downlink CDMA transmission is interrupted for the measurements and signalling reception to be possible.

Recently it has been shown that it is advantageous to interrupt also the uplink CDMA transmission for the duration of measurements and signalling reception. We will briefly describe the reasons behind this observation by reference to FIG. 1, where the GSM1800 system (Global System for Mobile telecommunications at 1800 MHz; also known as the DCS1800 or Digital Cellular System at 1800 MHz) is considered as an exemplary cellular radio system of the second generation. The uplink frequencies of the GSM1800 system lie between 1710 and 1785 MHz and the corresponding downlink frequencies between 1805 and 1880 MHz. From the downlink frequency range upwards there is a narrow range for DECT frequencies (Digital European Cordless Telephone) and another narrow range for UTRA TDD frequencies (Time Division Duplex). The UTRA FDD uplink frequencies (Frequency Division Duplex) lie between 1920 and 1980 MHz and the corresponding downlink frequencies between 2110 and 2180 MHz. Therebetween is also another relatively narrow range for UTRA TDD frequencies from 2010 to 2025 MHz.

If a mobile terminal is considering a handover from an UTRA FDD cell to a GSM1800 cell, it should be able to receive and decode signalling messages on the GSM1800 downlink frequency range. The UTRA FDD uplink frequency range is so close to the GSM1800 downlink frequency range that a simultaneous uplink transmission on the former is very likely to cause a RF leakage through the duplex filter of the terminal to the receiver chain, thus interfering with or even disabling any measurements or reception for decoding. There are potential hardware solutions to this problem, such as using a different antenna for different frequency ranges and very high quality duplex filters, but they typically require considerable complication of the terminal structure and are therefore undesirable for the manufacturing point of view. It is much easier to arrange for suitable interruptions also in the uplink transmission, especially if such interruptions have already been specified for the corresponding downlink.

The accepted form of interrupting a CDMA transmission in an UTRA system for measurements and signalling reception is known as the slotted mode. It means generally that a predetermined part of a certain frame period will be left empty with no ongoing transmission. The frame including the information contents destined for transmission during such a frame period will be transmitted during the remaining part of the frame period in a compressed form, using for example a slightly higher transmission power. Three types of slotted mode have been suggested for use; additionally we may regard a combination of two of them as a fourth type. FIG. 2 illustrates the different types of slotted mode in a coordinate system where the horizontal axis represents time divided into frame periods (e.g. 10 ms) and the vertical axis represents transmission power in some arbitrary units. Frame 201 illustrates an idle period at the end of the frame period, frame 202 illustrates an idle period in the middle of the frame period and frame 203 illustrates an idle period at the beginning of the frame period. Mutually consecutive frames 204 and 205 are of the first and third types described above, whereby it is immediately obvious that there will be a relatively long idle period bridging the separation line between these consecutive frame periods. The "double length" idle period may be regarded as a fourth type of slotted mode, even if it is actually just a suitable coordinated arrangement of slotted modes of the first and third type.

In principle it would be possible to have a fixed allocation of simultaneous slotted frames for all mobile terminals in the cell of a CDMA base station. However, due to the large number of potential connections simultaneously active such a common slotted mode is not advisable, because it would cause large jumps in the amount of emitted transmission power. In practice the base station will compose a time schedule for the use of slotted mode in its cell and use terminal-specific signalling to allocate a unique or nearly unique pattern of slotted frames to each terminal so that the overall effect of the slotted frames to the average transmission power within the cell will be negligible.

Next we will describe briefly the known arrangement of channels which a GSM1800 base station will use for transmitting those common channel messages which the mobile terminal operating in a nearby cell should receive in order to prepare for a cell reselection or a handover to the cell in question. A complete description of the GSM1800 common channels (which follow the arrangement of the corresponding channels in the conventional 900-MHz GSM system) is available to the public from the GSM specifications published by the ETSI (European Telecommunication Standards Institute) and e.g. from the book Michel Mouly, Marie- Bernadette Pautet: The GSM System for Mobile Communications, published by the authors, ISBN 2-9507190-0-7, Palaiseau 1992. In the following description we will emphasize the timing aspects, because these are of importance to the present invention.

Each GSM base station will regularly transmit, on a certain common channel frequency, so-called FCCH and SCH messages (Frequency Correction CHannel; Synchronisation CHannel). The transmission schedules of all GSM channels have been determined in relation to the concept of a frame, which contains 8 consecutive time slots or BPs (Burst Periods) each having the length of 15/26 ms (approximately 0.577 ms). On said common channel frequency we may take a period of 51 frames and designate the frames therein from 0 to 50; in such arrangement the first time slot of the 0th, 10th, 20th, 30th and 40th frame will contain an FCCH message and the first time slot of the 1st, 11th, 21th, 31th and 41th frame will contain an SCH message. In other words we may say that a GSM base station will transmit on said common channel frequency FCCH messages with regular intervals so that four consecutive intervals will be of approximately 46.154 milliseconds and the fifth interval after them will be approximately 50.769 milliseconds, and an SCH message will follow each FCCH message approximately 4.615 milliseconds later.

The frame duration of the UMTS has been defined to be 10 ms. It has been noted that the relation of the FCCH and SCH schedules of GSM to the frame timing of UMTS is such that no periodicity of relatively short length will occur. The advantage of such non-periodicity is that when an UTRA base station will allocate certain frames for slotted mode, it is inevitable that sooner or later the measurement interval left free by a slotted frame will coincide with the transmission moment of an FCCH or SCH message from a nearby GSM base station.

The disadvantage of the above-explained prior art system is that in order for the mobile terminal to find, receive and decode a sufficient number of FCCH and/or SCH messages from the nearby GSM base stations a relatively large number of slotted frames will be required. Not only is the probability of error-free reception of a slot ted-mode compressed frame lower than that of a regular frame; we must also take into account the higher power level needed to transmit the compressed frame. It is known that the transmission power level in each CDMA connection affects the interference level experienced by other simulteneous connections with a direct proportionality, in the same cell as well as in the neighboring cells. All in all it has been suggested that the slotted mode in its known form might eat up to 15 to 20 per cent of the total WCDMA system capacity.

SUMMARY OF THE INVENTION

It is therefore an object of the present invention to provide a method and arrangement for enabling the necessary measurement and reception functions during an active CDMA connection with only a minor effect on the overall system capacity.

The objects of the invention are achieved by providing a CDMA base station with knowledge about the relevant transmission schedules of the nearby other base stations so that the slotted frames may be allocated in optimal way.

The method according to the invention is characterised in that it comprises the steps of establishing knowledge that indicates at least one future occurrence of signalling external to a first communication connection, identifying, on the basis of said established knowledge, a future frame associated with the first communication connection that will coincide in time with said future occurrence of signalling external to the first communication connection and defining the identified future frame as a frame allocated for measurement and reception of signalling external to the first communication connection.

The invention also applies to a base station subsystem having as its characteristic features means for establishing knowledge that indicates at least one future occurrence of signalling external to a first communication connection, means for identifying, on the basis of said established knowledge, a future frame associated with the first communication connection that will coincide in time with said future occurrence of signalling external to the first communication connection and means for defining the identified future frame as a frame allocated for measurement and reception of signalling external to the first communication connection, and for communication such a definition to the mobile terminal.

The large amount of wasted capacity in a prior art arrangement is caused by the fact that the CDMA base stations allocate slotted frames to mobile terminals without any knowledge about the transmission schedules of the nearby other base stations. Consequently the mobile terminals will spend a relatively large number of measurement intervals by bootlessly looking for FCCH and/or SCH messages that simply are not on the air during a certain measurement interval. According to the invention a CDMA base station, or more generally a base station employing a substantially continuous transmission mode, will know beforehand, when a nearby other base station will transmit such a message that a mobile terminal should be able to receive. The CDMA base station will then allocate a slotted frame so that it coincides with the known transmission instant of the message in question.

There are several ways for providing a base station (or some other network device that is responsible for the slotted mode allocations) with the knowledge about the transmission schedules of nearby other base stations. In many cases a CDMA base station and the other base station will be installed at the same site, so a short cable from one equipment rack to another is enough to convey the required information. Even if the base stations are more distant from each other such a direct connection on the base station level is possible. An alternative embodiment requires that a base station controller or some other network element that is farther away from the base station towards a mobile switching centre or similar central installation collects the timing information that describes the operation of a number of base stations and communicates it to another base station controller, which then distributes the information to its own base stations. A further embodiment does not require explicit transmission of timing information at all: a CDMA base station may have a radio receiver of its own for continuously or regularly monitoring the FCCH and SCH transmissions of nearby other base stations so that it will find out their regular schedules.

By arranging the slotted mode allocations to the terminals according to unique or nearly unique allocation patterns, and by ensuring that at least a considerable number of the allocated slotted frames coincide with simultaneous signalling messages from the nearby base stations a CDMA base station will be able to remarkably diminish the amount of capacity wasted due to the use of slotted mode.

BRIEF DESCRIPTION OF DRAWINGS

The novel features which are considered as characteristic of the invention are set forth in particular in the appended Claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION

Figure 3:
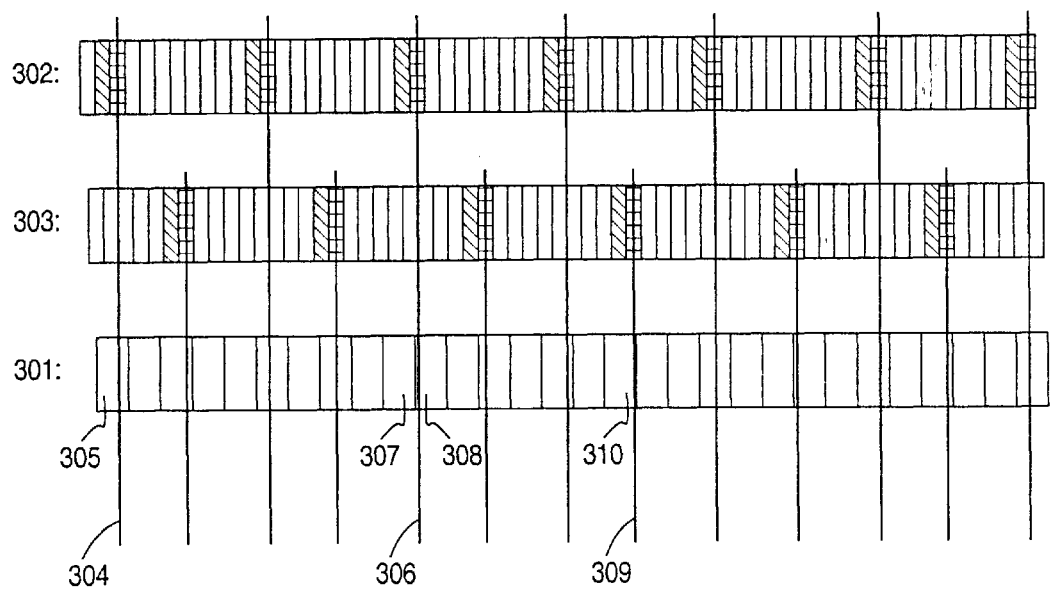
FIG. 3 illustrates an examplary timing of slotted frames according to the invention.

FIG. 3 illustrates a situation where a train of temporally consecutive CDMA frames 301 coexists simultaneously with two trains of temporally consecutive GSM frames 302 and 303. In the GSM frame trains there are certain frames, indicated by inclined hatch, that contain an FCCH message. Likewise there are certain GSM frames, indicated by horizontal hatch, that contain an SCH message. It is the duty of a certain network element to find such CDMA frames during which it would be possible to receive a certain message (here: an SCH message) transmitted in a GSM frame. To facilitate the comparison of frame transmission moments, a vertical line has been drawn through each GSM frame where an SCH message will be transmitted.

Figure 1:
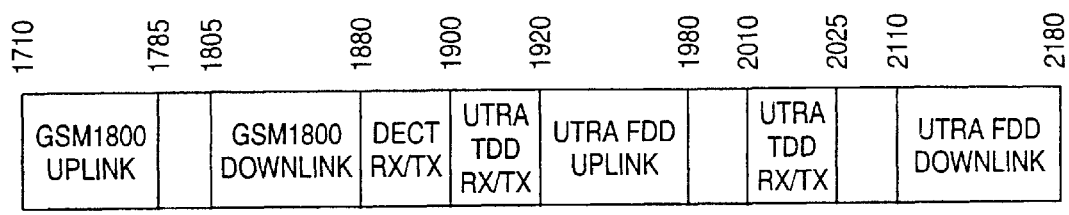
FIG. 1 illustrates the known division of frequency ranges between some cellular radio systems.
Figure 2:
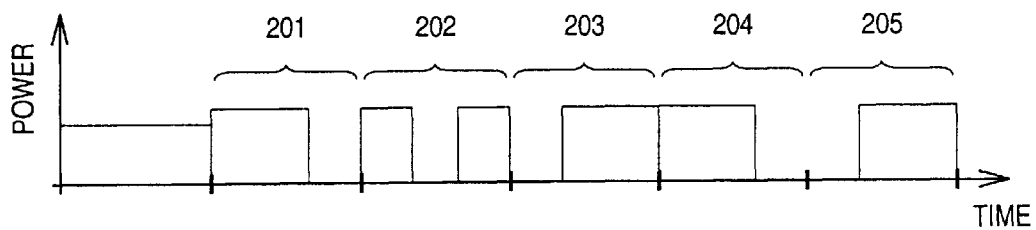
FIG. 2 presents the known types of slotted frames.

It is easily seen from FIG. 3 that at point 304 there will be an SCH message transmission in the GSM frame train 302 so that the actual message (which is in the beginning, or first time slot of the GSM frame; time slots are not separately shown) will coincide with approximately the middle point of the CDMA frame 305. It is therefore advisable to allocate frame 305 as a slotted frame of the second type (see 202 in FIG. 2) so that the idle period in the middle of the slotted CDMA frame will coincide with the SCH message to be received. At point 306 the SCH message transmission in GSM frame train 302 will take place at more or less the frame limit between CDMA frames 307 and 308, so a good choice would be to allocate frame 307 as a slotted frame of the first type and frame 308 as a slotted frame of the second type so that their combination will form the alleged slotted frame of the fourth type. Similarly at point 309 there will be an SCH message transmission in the GSM frame train 303 so that if the CDMA frame 310 is allocated as a slotted mode frame of the first type, it will most probably be possible to receive the SCH message transmission during the idle period at the end of frame 310.

From FIG. 3 we see that as soon as a CDMA base station (or some other network device that is responsible for the slotted mode allocations) knows the starting point of the cycle of 51 frames used at each GSM base station, it will be able to point out those CDMA frames that are good candidates for different types of slotted mode allocations by using the known frame GSM duration and the known occurrence of FCCH and SCH transmissions in relation to the 51 frame period. It should be noted that the different GSM base stations have no common timebase for their frame cycles so in order to recognise all suitable candidates for slotted frame allocations the CDMA base station to other network device must handle each nearby GSM base stations separately. The CDMA base station or other network device may then compose a schedule for slotted mode usage according to the known principle of distributing the slotted frames in different connections in non-simultaneous fashion, and use known forms of terminal-specific signalling for informing the terminals in question about the decided slotted frame allocations.

It is possible in principle for the base station or other network device to indicate each allocated slotted frame separately to each terminal. However, this is uneconomic in terms of the amount of required signalling. A more favourable alternative is to define a certain pattern of a number of allocated slotted frames, known in advance by both the base station or other network device and the terminal, so that it suffices to indicate the starting point of the structure in relation to the train of consecutive CDMA frames. There may also be a number of uniquely identified allocation patterns defined in advance so that the base station or other network device will have to indicate to the terminal, which pattern will be used and what is the starting point in relation to the train of consecutive CDMA frames.

Next we will describe an advantageous way of defining the slotted mode allocation patterns referred to above. An analysis of the frame periods of GSM and UMTS reveals that there is, after all, certain mutual periodicity. The cyclically repeated group of 51 consecutive GSM frames referred to above is known as a multiframe. If we take 13 consecutive GSM multiframes we get a frame train the duration of which is exactly 3060 milliseconds, or exactly as long as the duration of 306 consecutive UMTS frames. Further we may note that 26 consecutive GSM multiframes constitute a so-called GSM superframe the duration of which is 6120 milliseconds. On the other hand, 72 consecutive UMTS frames constitute a UMTS superframe of 720 milliseconds. If we take 17 consecutive UMTS superframes we get a UMTS frame train the duration of which is exactly 12240 milliseconds, exactly the same as the duration of two consecutive GSM superframes.

Figure 4:
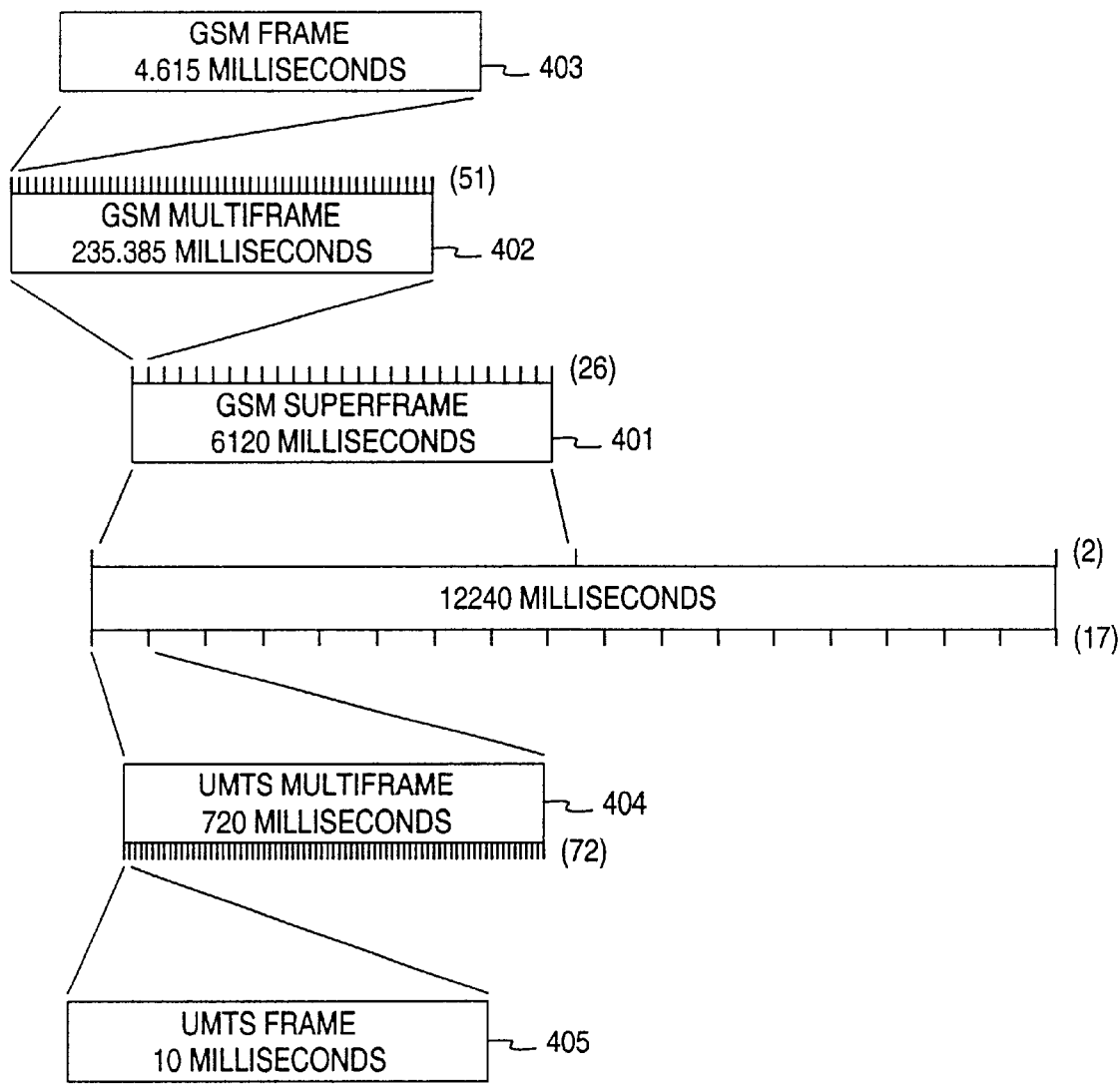
FIG. 4 illustrates some temporal relations of frame and frame block durations exploited in connection with the invention.

FIG. 4 illustrates the mutual relations of the above-mentioned time intervals. A period of 12240 milliseconds may be seen to contain, on one hand, two consecutive GSM superframes 401, each of them containing 26 consecutive GSM multiframes 402, each of them containing 51 consecutive GSM frames 403. On the other hand the period of 12240 milliseconds may seen to contain 17 consecutive UMTS superframes 404, each of them containing 72 UMTS frames 405.

The periodicity with the time cycle of 3060 milliseconds suggests that in a very simple embodiment of the invention it suffices for the base station or other network device to indicate to the mobile terminal a desired number of UMTS frames out of a sequence of 306 consecutive UMTS frames. Together with the indications the base station or other network device will designate the indicated UMTS frames as slotted frames of the first, second or third type. The mobile terminal may then repeatedly apply the corresponding pattern of slotted mode frames with the cycle of exactly 306 frames, and during the idle period of each slotted frame try to receive a signalling message from some nearby GSM base station.

In a slightly more complicated embodiment the base station or other network device will identify an UMTS frame within a period of 306 consecutive UMTS frames by giving its running number N ($0 \leq N \leq 305$) and an offset number n ($0 \leq n \leq 3$) so that together the numbers identify the Nth UMTS frame from the nth consecutive block of 306 UMTS frames. This definition for frame identification makes it possible to uniquely identify any UMTS frame from the time period of 12240 milliseconds illustrated in FIG. 4. The message that contains such a frame identification would need to have nine bits for the number N and two bits for the number n.

An even more versatile embodiment of the invention would use nine bits to identify an UMTS frame out of a sequence of 306 consecutive UMTS frames, and four bits that represent the four consecutive 306-frame blocks that together constitute the 12240 millisecond period. With the four bits it is possible to indicate any combination of block repetitions within the four-block period of 12240 ms, so that for example a value '0110' tells the mobile terminal that the identified UMTS frame in the second and third blocks will be slotted (value '1' of the second and third bits) but not in the first or fourth block (value '0' of the first and fourth bits).

In those embodiments where the identification of the slotted frame(s) is based solely on repetitions of blocks of 306 UMTS frames, it is naturally necessary to make sure that the mobile terminal knows, what does the base station or other network device regard as the beginning of a 306-frame block. In those embodiments where also the 12240 ms period of 4 times 306 UMTS frame blocks is used, the starting point of the 12240 ms period must be known both to the base station or other network device and the mobile terminal. Several prior art methods are known as such to share information about the beginning of a certain period of consecutive frames between a terminal and a base station.

Figure 5:
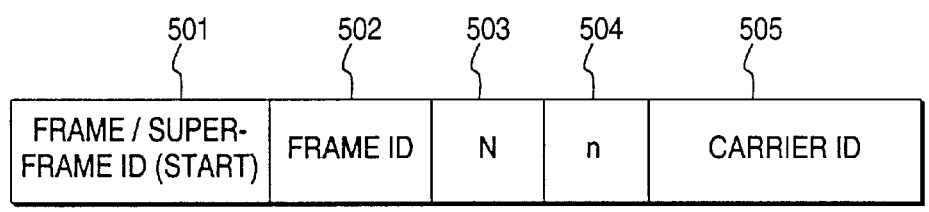
FIG. 5 is an exemplary form of a signalling message employed by the invention.

FIG. 5 illustrates an advantageous form for a group of information elements in a signalling message with which a base station or other network device may indicate to a mobile terminal a certain slotted frame and the use it is for. Field 501 contains the identification of the UMTS frame or superframe where the sequence of frames referred to in the message will start. Frames and superframes will be numbered anyway, so a simple number in field 501 is enough to identify a frame or super-frame. Field 502 contains the nine-bit number N referred to above, identifying a certain UMTS frame within a block of 306 consecutive UMTS frames, and field 503 contains the two-bit number n referred to above, setting down a certain block offset from 0 to 3. Field 504 contains a two-bit number that identifies the type of slotted mode to be applied in the identified UMTS frame, and field 505 contains an identifier that reveals to the mobile terminal, which GSM carrier it should measure and receive during the idle period of the identified slotted UMTS frame. Within the GSM system there is a known method for identifying GSM carriers, so the same method is most advantageously used here.

The base station or other network device may transmit to the mobile terminal as many messages of the form illustrated in FIG. 5 as it regards necessary. One message of such form will allocate only one UMTS frame in each consecutive period of 12240 ms as a slotted frame, so the effect to the overall system capacity is minimal.

Each new message to the mobile terminal will allocate another slot in each consecutive period of 12240 ms. The need for several simultaneous allocations may rise from two different sources. The more probable of these is the situation where the base station or other network device knows that there are several possible GSM cells nearby which the mobile terminal might consider for suitable candidates for cell reselection or handover. The other reason is that there may be timing uncertainty, connection quality problems or some other reasons that make it difficult for the mobile terminal to receive and decode the required FCCH and/or SCH messages from the GSM base stations correctly. Allocating more slotted frames to the measurement and reception of a single GSM carrier will enhance the probability of successful reception and decoding.

A question that may be made concerning the validity of a slotted mode allocation is, for how long time should a slotted mode allocation be valid. A simple way to solve this problem would be to specify that a slotted mode allocation will remain valid for X frame periods from the starting point referred to as 501 in FIG. 5, in which X is a positive integer laid down by the system specifications. A more subtle way of determining the allocation's temporal duration is to specify that a mobile terminal that has received a slotted mode allocation is obliged to, once having successfully performed the corresponding measurement and/or reception, report the obtained results to the base station or other network device. The slotted mode allocation would then remain valid until the mobile terminal has reported the results. These alternatives may be combined in various ways, e.g. the allocation is valid until the report has been sent but in any case not longer than X frame periods, or the allocation will remain valid for another X frame periods after the report has been sent.

Figure 6:
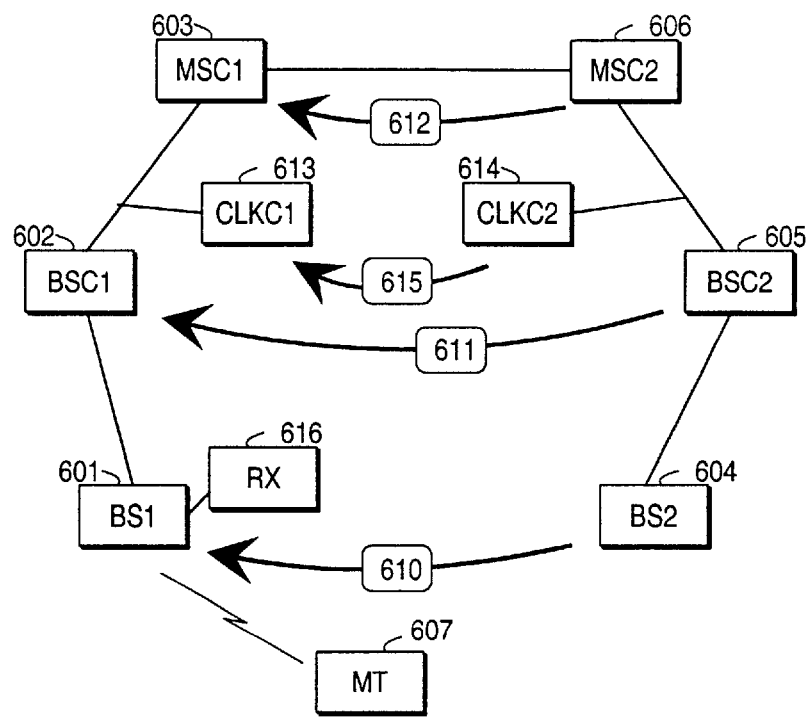
FIG. 6 illustrates a certain cellular radio system where the invention is applied and FIG. 7 illustrates a method according to an advantageous embodiment of the invention.

FIG. 6 illustrates an arrangement where a first cellular radio system and a second cellular radio system have been deployed onto a common geographical area. The first cellular radio system may be considered to be an UMTS/UTRA system and the second cellular radio system may be considered to be a GSM system. For simplicity, only a very limited number of the actual network elements have been shown. The first cellular radio system comprises a first base station 601, a first base station controller 602 and a first mobile switching centre 603. Correspondingly the second cellular radio system comprises a second base station 604, a second base station controller 605 and a second mobile switching centre 606. It is also possible that a radio access system (comprising a number of base stations and at least one base station controller or a similar centralized control device) of the third generation and another of the second generation share common switching facilities, i.e. are connected to a single mobile switching centre. In any case there will be a communication connection between the cellular radio systems; in FIG. 6 this is illustrated as a cable connection between the mobile switching centres.

A mobile terminal 607 has an active CDMA communication connection with the first base station 601. In this embodiment of the invention we will assume that the base stations of the first cellular radio system are responsible for making the slotted mode allocations. To accomplish this, the first base station 601 must possess the knowledge about the timing of frames and 51-frame multiframes (and eventually also the 26-multiframe superframes) used by the second base station 604. FIG. 6 shows several alternative ways of providing the first base station with this knowledge. The first alternative is a direct connection 610 from the second base station to the first base station, through which the second base station will give a clock pulse or some other information that uniquely describes the frame, multiframe and superframe timing. The second alternative is that there is, on the level of base station controllers, a connection 611 between the two cellular radio systems. The second base station controller would then collect the timing information describing all those base stations that operate under its command, and send it to the first base station controller for distribution to the respective base stations operating under its command. A third alternative is that a similar connection 612 is established on the level of mobile switching centres.

A fourth alternative is that each cellular radio system comprises a common clock 613 or 614 for synchronizing all frame, multiframe and superframe timings within the system, and that the common clocks of the two systems have a connection 615 therebetween for exchanging synchronization information. A fifth alternative is that the first base station 601 has at its disposal a radio receiver 616 with which it can search, receive and decode all FCCH and SCH transmissions coming from nearby second generation base stations. The radio receiver 616 may stand at the same location with the first base station or it may be situated somewhere else. This way the first base station would be completely independent of any external synchronization commands, which is advantageous because it makes it easier to set up new base stations and base station subsystems of the third generation.

A sixth alternative for providing the first base station with the necessary timing information is that the first base station maintains a database where it stores the executed slotted frame allocations and the corresponding result reports from the mobile terminals 607. After a relatively short period of operation it will be easy to see certain trends in the database: certain slotted frame allocations will produce reports indicating a successful reception, while certain other allocations will not result in anything useful. By concentrating on the successful allocations the first base station will be able to draw conclusions about the frame, multiframe and superframe timing of the nearby base stations of second generation.

A seventh alternative is to exploit the capability of some present and/or future multimode mobile terminals to compare the time bases of different cellular systems. Such a mobile terminal 607 may receive enough signalling messages from both second and third generation base stations and transmit a message to the third generation base station with approximately the following content: "The timing of the common channel transmissions at the nearby second generation base station X is such that the next exact coincidence of its FCCH transmission with a certain UMTS frame from you will be in the UMTS frame number YYY." Here X is a unique identifier of the second generation base station and YYY is a unique identifier of some future UMTS frame. Naturally many other formulations for the message are possible as long as it indicates the timing relations of the second and third generation cellular radio systems.

The alternatives presented above are not mutually exclusive. The invention allows also for other methods for providing the first base station with the necessary timing information.

Figure 7:
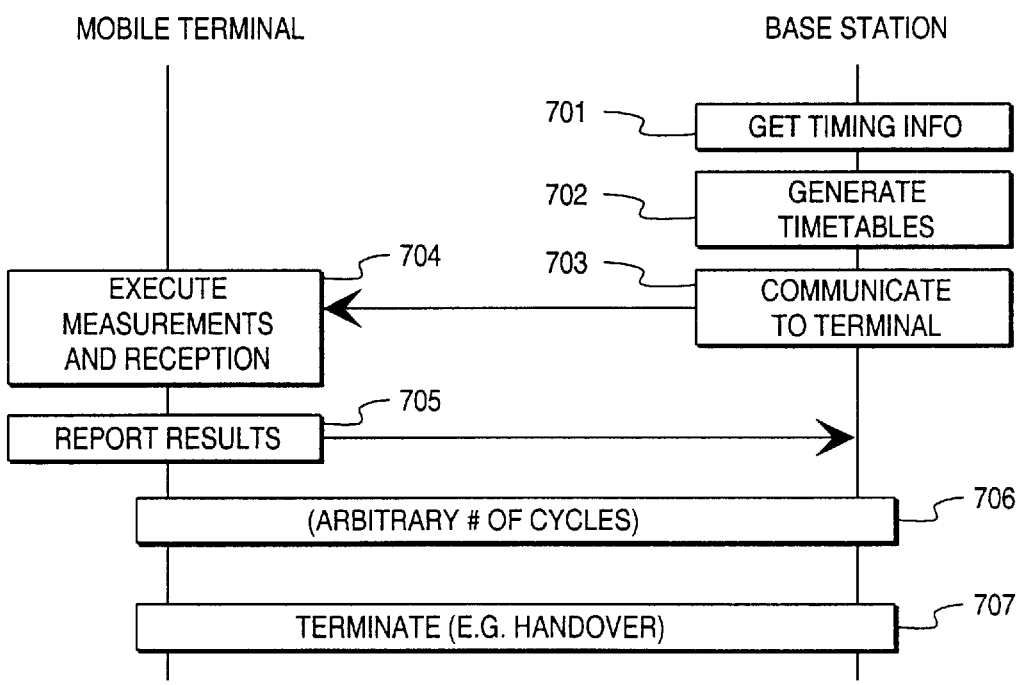

We will conclude by presenting an advantageous embodiment of a method according to the invention with reference to FIG. 7. In the following description we will continue assuming that a base station is responsible for the slotted mode allocations; the description is easily generalized to cover an arbitrary network element. The first stage 701 of the method is the one where an UMTS base station acquires, by one way or another, information about the frame, multiframe and superframe timing of at least one nearby base station of second generation. At the second stage 702 the base station generates a certain terminal-specific timetable that consists of such UMTS frames that are suitable for slotted mode allocation; the suitability of the UMTS frames is easily deduced by a method described above with reference to FIG. 3. There are basically two alternative ways of implementing stage 702: either the base station generates a "library" of terminal specific timetables in advance so that when a certain slotted mode allocation needs to be made it only selects a suitable previously generated timetable from the library, or the base station generates new terminal-specific slotted mode allocation timetables only according to need, i.e. as a response to a certain mobile terminal registrating itself for operation in the cell of the base station.

In any case the generation of a new terminal-specific slotted mode allocation timetable at stage 702 will advantageously follow certain rules:

at least a majority of the frames to be allocated for slotted mode must coincide in time with the known transmission moments of FCCH and/or SCH messages from the other base stations, if the available information describing the frame, multiframe and superframe timing is known to be accurate, individual slotted frames of preferably the second type but also of the first and third type may be allocated; if the timing information is known to be inaccurate or the accuracy of the timing information is not known at all, slotted frames of the first and third types should be allocated in pairs so that a longer idle period will be available, and if there are nearby base stations of several frequency bands or even of different cellular radio systems, the slotted mode allocation timetable should take into account the terminal's ability to communicate with the different base stations; for example, if a terminal can communicate with a GSM base station on 900 MHz but not with a GSM1800 base station on 1800 MHz, it is of no use to allocate slotted frames for those occasions when there will be an FCCH or SCH transmission from the nearby GSM1800 base station.

At stage 703 the base station communicates the generated timetable of slotted frame allocations to the mobile terminal. The communication may take the form of one or several messages of the type described above with reference to FIG. 5. In other words, the timetable may consist of one or more (cyclically repeatable) slotted frame allocations. At stage 704 the mobile terminal executes measurements and signalling reception according to the given timetable, and at stage 705 it will report the corresponding results to the base station. The invention does not limit the purposes to which the base station may use the reported results. Stage 706 represents an arbitrary number of repeated allocation, measurement and reporting cycles. The operation ends with the mobile terminal being switched off or performing a handover to the cell of another base station at stage 707.

It is clear to the person skilled in the art that although the GSM and UMTS systems have been described above as exemplary cellular radio systems of the second and third generations respectively, the invention is applicable to all such situations where there exists the possibility of handover from a cell where an essentially continuous transmission mode is employed to another cell, and where such a handover should be preceded by preparatory reception of signalling messages according to a certain timetable from the other base station.

What is claimed is:

1. A method for defining the timing of frames associated with a certain first communication connection and allocated for measurement and reception of signalling external to said first communication connection in a cellular radio system, comprising the steps of arranging the transmission associated with communication connections to be essentially continuous and to consists of consecutive frames;

arranging for the measurement and reception of signalling external to a communication connection to necessitate an interruption in the otherwise continuous transmission associated with the communication connection;

establishing knowledge that indicates at least one future occurrence of signalling external to the first communication connection;

identifying, on the basis of said established knowledge, a future frame associated with the first communication connection that will coincide in time with said future occurrence of signalling external to the first communication connection; and defining the identified future frame as a frame allocated for measurement and reception of signalling external to the first communication connection.

2. A method according to claim 1, comprising the steps of establishing knowledge that indicates a regular future occurrence of signalling external to the first communication connection, identifying, on the basis of said established knowledge,
a future frame associated with the first communication connection and
a repetition cycle so that the identified frame and a certain number of its repetitions that occur after an integer number of repetition cycles will coincide in time with future occurrences of signalling external to the first communication connection and defining the identified future frame and said certain number of its repetitions as frames allocated for measurement and reception of signalling external to the first communication connection.

3. A method according to claim 1, comprising the steps of establishing knowledge that indicates a regular future occurrence of signalling external to the first communication connection, identifying, on the basis of said established knowledge,
a future frame associated with the first communication connection and
a repetition cycle so that the identified frame and a certain number of its repetitions that occur after an integer number of repetition cycles will coincide in time with future occurrences of signalling external to the first communication connection, determining a certain maximum duration of frame allocations associated with the first communication connection and defining the identified future frame and such a number of its repetitions that does not exceed said maximum duration of frame allocations as frames allocated for measurement and reception of signalling external to the first communication connection.

4. A method according to claim 3, wherein said maximum duration of frame allocations is determined as a maximum number of repetitions of the identified frame that occur after an integer number of repetition cycles.

5. A method according to claim 3, additionally comprising the step of requiring a device performing the measurement and reception of signalling external to said first communication connection to report the results of such measurement and reception, so that said maximum duration of frame allocations corresponds to the time until the reporting of the results will take place.

6. A method according to claim 3, additionally comprising the step of requiring a device performing the measurement and reception of signalling external to said first communication connection to report the results of such measurement and reception, so that said maximum duration of frame allocations is determined as a maximum number of repetitions of the identified frame that occur after an integer number of repetition cycles after the reporting of the results has taken place.

7. A method according to claim 1, corresponding to defining the timing of frames associated with a certain first communication connection between a first base station of a first cellular radio system and a mobile terminal, said frames being allocated for measurement and reception of signalling from a second base station of a second cellular radio system, whereby the step of establishing knowledge that indicates at least one future occurrence of signalling external to the first communication connection comprises the substeps of establishing knowledge about the timing of signalling from said second base station and providing said first base station with the established knowledge about the timing of signalling from said second base station.

8. A method according to claim 7, wherein the substep of providing said first base station with the established knowledge about the timing of signalling from said second base station corresponds to establishing a direct communication connection between the first and second base stations.

9. A method according to claim 8, wherein said direct communication connection is a wireline connection configured at both base stations to communicate information about the timing of signalling from said second base station.

10. A method according to claim 8, wherein said direct communication connection is a radio connection in which a radio receiver coupled to the first base station receives the signalling transmitted by said second base station.

11. A method according to claim 7, wherein the substep of providing said first base station with the established knowledge about the timing of signalling from said second base station corresponds to establishing a communication connection between the first and second base stations over other parts of the first and second cellular radio systems.

12. A method according to claim 7, wherein the substep of providing said first base station with the established knowledge about the timing of signalling from said second base station corresponds to establishing a common time base for signalling from said second cellular radio system and synchronising the operation of the first cellular radio system to said common time base.

13. A method according to claim 7, wherein the substep of providing said first base station with the established knowledge about the timing of signalling from said second base station corresponds to receiving at the first base station reports from a number of mobile terminals, said reports indicating the timing of signalling from said second base station.

14. A method according to claim 13, wherein said reports indicate the timing of signalling from said second base station indirectly by indicating either successful or unsuccessful reception of signalling from said second base station during previously allocated frames for measurement and reception of signalling external to said first communication connection.

15. A method according to claim 13, wherein said reports indicate the timing of signalling from said second base station directly by indicating its relation to the frames associated with the first communication connection.

16. A network element of a cellular radio system, comprising means for indicating certain frames—associated with an essentially continuous first communication connection consisting of consecutive frames between a base station and a mobile terminal—as allocated for measurement and reception of signalling external to said first communication connection, means for establishing knowledge that indicates at least one future occurrence of signalling external to the first communication connection, means for identifying, on the basis of said established knowledge, a future frame associated with the first communication connection that will coincide in time with said future occurrence of signalling external to the first communication connection and means for defining the identified future frame as a frame allocated for measurement and reception of signalling external to the first communication connection, and for communication such a definition to the mobile terminal.

17. A network element according to claim 16, wherein for establishing knowledge that indicates at least one future occurrence of signalling external to the first communication connection it comprises a wireline connection to a base station of another cellular radio system.

18. A network element according to claim 16, wherein for establishing knowledge that indicates at least one future occurrence of signalling external to the first communication connection it comprises a radio receiver for receiving signalling transmitted by a base station of another cellular radio system.

\* \* \* \* \*